United States Patent [19]

Inoue et al.

[11] Patent Number: 4,715,010

[45] Date of Patent: Dec. 22, 1987

[54] SCHEDULE ALARM DEVICE

[75] Inventors: Tomohiro Inoue; Shinji Tsugei; Shigeki Iguchi, all of Nara, Japan

[73] Assignee: Sharp Kabushiki Kaisha, Osaka, Japan

[21] Appl. No.: 765,239

[22] Filed: Aug. 13, 1985

[30] Foreign Application Priority Data

Aug. 14, 1984 [JP] Japan ................. 59-169563

[51] Int. Cl.⁴ .................. G06F 15/62; G06F 3/02; G06F 3/14
[52] U.S. Cl. .................. 364/705; 364/900; 368/43; 368/251
[58] Field of Search .......... 364/705, 707, 900; 368/12, 41, 42, 43, 63, 251

[56] References Cited

U.S. PATENT DOCUMENTS

| 4,117,542 | 9/1978 | Klausner et al. | 364/900 |
| 4,276,541 | 6/1981 | Inoue et al. | 364/900 X |
| 4,279,022 | 7/1981 | Abe | 364/900 |
| 4,362,392 | 12/1982 | Kumata | 364/705 X |
| 4,368,988 | 1/1982 | Tahara et al. | 368/63 |
| 4,402,056 | 8/1983 | Sado et al. | 364/705 |
| 4,459,036 | 7/1984 | Sado et al. | 368/251 X |

*Primary Examiner*—Felix D. Gruber
*Attorney, Agent, or Firm*—Birch, Stewart, Kolasch & Birch

[57] ABSTRACT

An easy to use schedule alarm is disclosed which is capable of sounding an alarm and displaying the content of a schedule or memorandum automatically without setting the alarm time or entering a data display instruction. With the scheduled data or memorandum being entered into the device in advance, it can notify the scheduled times by sounding an alarm and by displaying the contents of a schedule and memorandum thus serving to prevent one from leaving out scheduled times and data.

2 Claims, 8 Drawing Figures

| M W | |
|---|---|
| Date | Data |
| June 5 | • Washing goods<br>• Umbrella<br>• Changing clothes |

Fig. 5 (a)

| M S | |
|---|---|
| Date | Data |
| June 5<br>9:30 | Departure time from Osaka 8:30 Hikari 236 |
| June 5<br>13:00 | |

Fig. 5 (b)

| S R | |
|---|---|
| Date | Time |
| June 5 | 9:30 |
| June 5 | 13:00 |

Fig. 5 (c)

SCHEDULE ALARM DEVICE

BACKGROUND OF THE INVENTION

This invention is concerned with a schedule alarm device which displays a stored schedule, memorandum, or the like or the sounding of an alarm without the need for setting display time in advance.

Recently, there are many types of electronic calculators, clocks and wrist watches that store a day's schedule, memorandum, or the like and display a particular item of the stored contents at a certain time. Among others, a so-called schedule alarm device that sounds an alarm synchronizing the schedule is on the market. Such a type of schedule alarm device is generally provided with a timer and is usually used as a clock. It is also used as an alarm clock, shedule and memorandum by setting time and schedule.

However, to operate such types of schedule alarm devices, the scheduled time must be set in the device in advance and a read-data instruction to display the contents of the stored schedule is needed.

SUMMARY OF THE INVENTION

The objective of this invention is to offer an improved schedule alarm device that can automatically sounds an alarm and display the contents of the stored schedule without the need for setting alarm time or a read-data instruction.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To provide the above objects, according to a preferred embodiment of the present invention, a schedule alarm device comprises the display means, input means, means for data, a CPU (central processing unit), timer and alarm means.

BRIEF DESCRIPTION OF THE DRAWINGS

The present invention will be better understood from the detailed description given hereinbelow and the accompanying drawings which are given by way of illustration only, and thus are not limitative of the present invention in which:

FIGS. 5(a), (b) and (c) show examples of the contents in each memory area.

DESCRIPTION OF THE INVENTION

Figure 1:
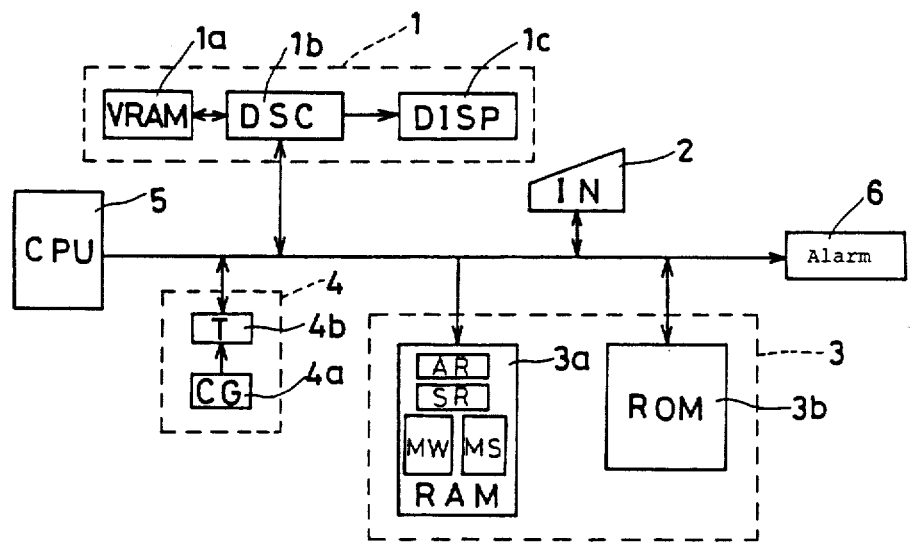
FIG. 1 shows a block diagram of a preferred example of a schedule alarm device according to the present invention.

FIG. 1 shows the block diagram of a preferred example of the present invention of a schedule alarm device. It consists of display unit 1, input device 2, memory 3, timer 4, central processing unit 5 and alarm 6. The display unit 1 comprises video RAM 1a, display control circuit 1b and display screen-1c. The input device 2 comprises a tablet for handwriting entry, a keyboard, etc. The memory comprises RAM 3a, and ROM 3b. The timer 4 comprises clock generator 4a and register 4b.

Figure 2:
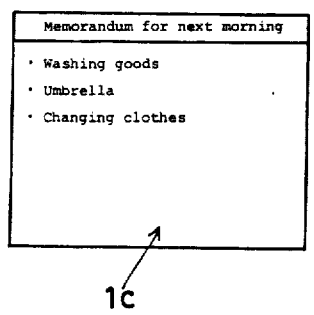
FIGS. 2(a) and (b) show the top views of the displayed state in a preferred example.
Figure 2:
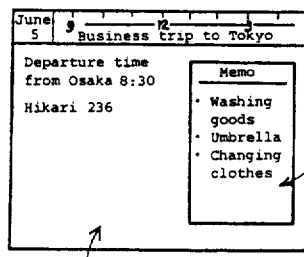

FIGS. 2(a) and (b) show the display screen 1c of display unit 1. The contents of memorandum to be stored in the memory are displayed on the screen so that they can be checked visually. When the contents of a memorandum are displayed along with sounding of an alarm, they are displayed in the window 1d at the specified position as shown in FIG. 2(b).

Figure 3:
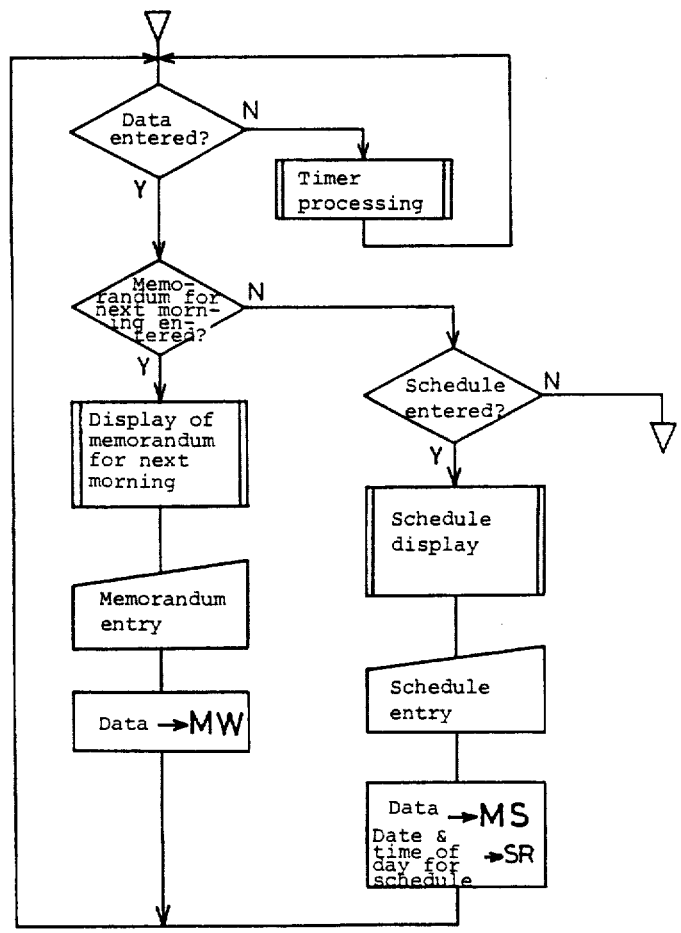
FIGS. 3 and 4 show flow diagrams of operations in a preferred example.

Operations of the schedule alarm device (see FIGS. 3 and 4) of the present invention will be described below.

Figure 4:
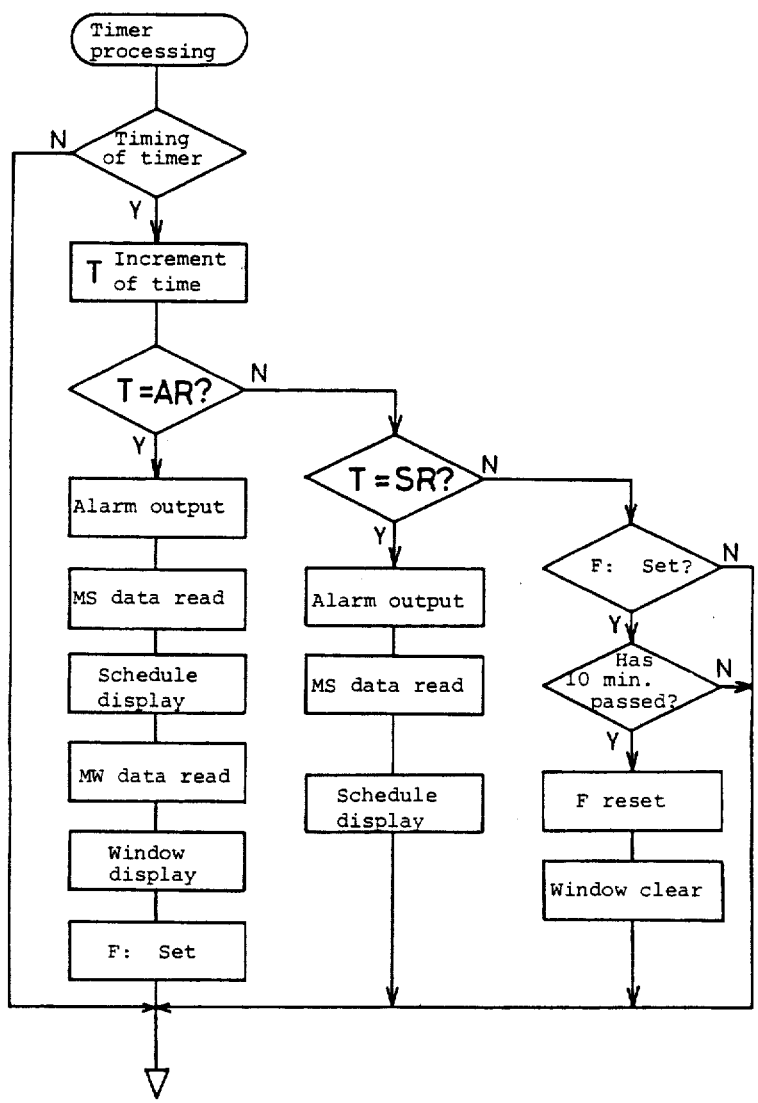

To enter memorandum or schedule into the device, the input device is set to the entry mode and select whether to enter memorandum or schedule. At this point, if you enter memorandum, as shown in FIG. 5(a), the contents of memorandum are stored in memory area MW of RAM 3a; the contents of schedule are stored in memory area MS of RAM 3a as shown in FIG. 5(b). Each scheduled time is stored in memory area AR, SR of RAM 3a as shown in FIG. 5(c). If no schedules or no memorandums are entered, the device functions as a clock and performs timer processing as shown in FIG. 4.

In this processing, the device counts up register 4b in timer 4 and every preset time interval (in a unit of seconds or minutes) to keep track of the scheduled time while counting time. When a certain scheduled time is reached, that is, when the value of register 4b becomes AR, the device sounds an alarm, reads the stored data from memory area MS in RAM 3a, displays the read data on the display screen, reads the memorandum data from memory area MW of RAM 3a and displays the data in the window 1d in the display unit 1 and sets flag F. In this case, since flag F is set, it is reset after passing a given time, for example, 10 min. when value T of register 4b is AR, the display in window 1d is cleared. When a scheduled time is reached, that is when the value T of register 4b reaches SR, the device sounds an alarm, reads the schedule data from memory area MS of RAM 3a and displays the schedule data on display screen 1c of display unit 1. In this case, flag F has not been set. Entry of data into the device can be effected through keyboard entry, handwriting entry as well as other means. Regarding input device, for handwriting entry, a tablet with a control circuit is used as an input unit. For keyboard entry, a keyboard is used. Input unit 2 and display unit 1 can be unified in a single unit.

In this way, the device functions as a schedule alarm device. The following describes how to enter data and how the device functions. When the contents of a schedule and memorandum are entered into the device on the previous day, since an instruction to sound the alarm when a scheduled time is reached is issued at the time of data entry, when the scheduled time is reached on that day, the device sounds the alarm, displays the scheduled content on the display unit and also displays the content of memorandum in the window of the display unit for a given period of time. This is repeated whenever a scheduled time is reached.

According to the present invention, the order of displaying the schedule data and memorandom read out of the memory ara is automatically selected to be in the order that the schedule data and memorandom relate to an earlier-set-time item.

While only certain embodiments of the present invention have been described, it will be apparent to those skilled in the art that various changes and modifications may be made therein without departing from the spirit and scope of the present invention as claimed.

What is claimed is:

1. A schedule alarm device comprising:

input means for selectively inputting at least one of schedule data and memorandum data, both said data having preselected times associated therewith;

memory means responsive to said input means for storing said schedule data and said memorandum data;

timer means for determining time;

display means for displaying at least one of said schedule data and said memorandum data;

alarm means for producing an audible alarm upon display of at least one of schedule data and memorandum data; and control means for controlling said display means such that said schedule data is displayed in response to the time determined by said timer means coinciding with said preselected time associated therewith and for controlling said display means such that said memorandum data is displayed in response to the time determined by said timer means coinciding with said preselected time associated therewith, said control means permitting simultaneous display of said schedule data and said memorandum data on said display means when said respective preselected times coincide.

2. The schedule alarm device of claim 1 further comprising means for deciding the preselected times associated with said schedule data and said memorandum data.

* * * * *